US 8,393,831 B2

(12) United States Patent
Onozawa

(10) Patent No.: US 8,393,831 B2
(45) Date of Patent: Mar. 12, 2013

(54) INDEXABLE DRILL AND DRILL BODY

(75) Inventor: Satoshi Onozawa, Iwaki (JP)

(73) Assignee: Tungaloy, Corporation, Fukushima (JP)

( * ) Notice: Subject to any disclaimer, the term of this patent is extended or adjusted under 35 U.S.C. 154(b) by 0 days.

(21) Appl. No.: 13/300,190

(22) Filed: Nov. 18, 2011

(65) Prior Publication Data

US 2012/0063857 A1 Mar. 15, 2012

Related U.S. Application Data

(63) Continuation of application No. PCT/JP2010/059314, filed on Jun. 2, 2010.

(30) Foreign Application Priority Data

Jun. 2, 2009 (JP) .................................. 2009-132907

(51) Int. Cl.
*B23B 51/02* (2006.01)
(52) U.S. Cl. ........ 408/223; 408/227; 408/230; 408/144; 408/233
(58) Field of Classification Search .......... 408/223–225, 408/144, 227, 229, 230, 231, 233, 713; 76/108.1, 76/108.6; *B23B 51/00, 51/02*
See application file for complete search history.

(56) References Cited

U.S. PATENT DOCUMENTS

| 5,429,458 A * | 7/1995 | Tukala et al. ................. 408/223 |
| 5,709,509 A * | 1/1998 | Wegener et al. ............. 407/114 |
| 6,030,155 A | 2/2000 | Scheer et al. |
| 2003/0161696 A1 * | 8/2003 | Fritsch et al. ................. 408/223 |
| 2003/0223833 A1 * | 12/2003 | Roman ......................... 408/224 |
| 2006/0260439 A1 | 11/2006 | Tubinger et al. |

FOREIGN PATENT DOCUMENTS

| JP | 63-245310 | 10/1988 |
| JP | H04-256522 | 9/1992 |
| JP | H06-91416 | 5/1994 |
| JP | 11090715 A * | 4/1999 |
| JP | 2000-508589 | 7/2000 |

(Continued)

OTHER PUBLICATIONS

Official Action dated Jan. 27, 2012 issued in Japanese counterpart application No. 2011-518462 (translation attached).

(Continued)

*Primary Examiner* — Daniel Howell
(74) *Attorney, Agent, or Firm* — Womble Carlyle

(57) ABSTRACT

An indexable drill includes an insert attachment seat and a chip discharging groove formed so as to extend from a leading end surface to a trailing end side of the drill in the direction of the axis of rotation and through which chips generated by the cutting insert are discharged, and in that a wall surface defining the chip discharging groove at least partly includes a smoothed surface with a surface roughness of at most 0.5 μm in terms of arithmetic average roughness Ra, the wall surface of the chip discharging groove is partly formed on a thinned wall portion thinned by the central edge attachment seat and the outer peripheral edge attachment seat, and a crossing portion between the first wall surface and the second wall surface in the thinned wall portion is rounded.

18 Claims, 6 Drawing Sheets

FOREIGN PATENT DOCUMENTS

| | | | | |
|---|---|---|---|---|
| JP | 2001191205 | A | * | 7/2001 |
| JP | 2001341021 | A | * | 12/2001 |
| JP | 2002301610 | A | * | 10/2002 |
| JP | 2004-74371 | | | 3/2004 |
| JP | 2004299017 | A | * | 10/2004 |
| JP | 2005022064 | A | * | 1/2005 |
| JP | 2006-167848 | | | 6/2006 |
| JP | 2006205285 | A | * | 8/2006 |
| JP | 2006-326752 | | | 12/2006 |

OTHER PUBLICATIONS

International Preliminary Report on Patentability (IPRP) dated Dec. 22, 2011 together with English translation of IPRP issued in counterpart PCT Application No. PCT/UP2010/059314.

International Search Report in PCT/JP2010/059314, dated Aug. 3, 2010.

* cited by examiner

INDEXABLE DRILL AND DRILL BODY

RELATED APPLICATIONS

This is a Continuation of International Patent Application No. PCT/JP2010/059314, filed Jun. 2, 2010, which published as WO 2010/140606A1 on Dec. 9, 2010 and claims priority to Japanese Patent Application No. 2009-132907, filed Jun. 2, 2009. The contents of the aforementioned applications are incorporated by reference in their entirety.

BACKGROUND OF THE INVENTION

1. Field of the Invention

The present invention relates to an indexable drill and a drill body of the indexable drill.

2. Description of the Related Art

Japanese Patent Laid-Open No. H06-91416(1994) discloses an indexable drill with a plurality of rows of grooves formed in a wall surface of a chip discharging groove and extending along an axis direction of a drill body. Chips contact only the plurality of surfaces formed by the plurality of rows of grooves. This reduces the contact area between the wall surface and the chips and thus a possible frictional force exerted between the wall surface and the chips. This enables the chips to be effectively urged to be discharged. Thus, the chips can be smoothly removed when a bore with a relatively large L/D is processed or when a difficult-to-machine material such as stainless steel or soft steel is bored; the L/D is the ratio of the depth L to diameter D of a bore.

In the indexable drill disclosed in the above publication, the plurality of rows of grooves formed in the wall surface of the chip discharging groove enable a reduction in the contact area between the wall surface of the chip discharging groove and the chips. On the other hand, the amount of friction between the plurality of rows of grooves and the chips may increase, thus making the surfaces of the plurality of rows of grooves easily worn away. Thus, disadvantageously, the effect of urging the chips to be smoothly discharged fails to last long. Furthermore, the above-described indexable drill uses a central edge insert and an outer peripheral edge insert for boring. Attachment seats for the respective two inserts provided at a leading end portion of the drill body form thinned wall portions that are thinner than the other portions. Hence, disadvantageously, when a strong force is applied to the thinned wall portions during boring, the thinned wall portions are easily broken.

SUMMARY OF THE INVENTION

The present invention is developed to solve the above-described problems. An object of the present invention is to provide an indexable drill and a drill body which serve to improve chip discharging efficiency and to achieve a high chip discharging efficacy for a long period. Another object of the present invention is to provide an indexable drill and a drill body which enable the thinned wall portions to be restrained from being broken by an excessive cutting force; the thinned wall portions are located where the insert attachment seats of the drill body are formed.

The present invention provides a drill body of an indexable drill including an insert attachment seat on which a cutting insert formed on a leading end side of the drill body in a direction of an axis of rotation is removably installed; and a chip discharging groove formed so as to extend from a leading end surface to a trailing end side of the drill body in the direction of the axis of rotation and through which chips generated by the cutting insert are discharged, wherein a wall surface defining the chip discharging groove at least partly comprises a smoothed surface with a surface roughness of at most 0.5 μm (JIS•B0601:2001) in terms of arithmetic average roughness Ra, the wall surface of the chip discharging groove is defined by a first wall surface facing in a drill rotating direction and a second wall surface crossing the first wall surface, the insert attachment seat comprises a central edge attachment seat on which the cutting insert is installed close to an axis of rotation and an outer peripheral edge attachment seat on which the cutting insert is installed away from the axis of rotation, the wall surface of the chip discharging groove is partly formed on a thinned wall portion thinned by the central edge attachment seat and the outer peripheral edge attachment seat, and a crossing portion between the first wall surface and the second wall surface in the thinned wall portion is rounded.

Preferably, the drill body is formed of one of materials including carbon steel, alloy steel, and tool steel, and has a hardness of at least 40 HRC and at most 60 HRC (JIS•Z2245: 2005) in terms of Rockwell hardness.

Preferably, the wall surface of the chip discharging groove is defined by a first wall surface and a second wall surface crossing the first wall surface, and a crossing portion between the first wall surface and the second wall surface is rounded.

Moreover, preferably, on the wall surface of the chip discharging groove, a coat with a higher hardness than the wall surface is formed. The coat includes preferably hard chrome plating.

An indexable drill according to the present invention is characterized by including the drill body according to the present invention.

The present invention enables discharging of chips to be smoothed and allows wear of the wall surface of the chip discharging groove to be suppressed which may result from contact of the chips with the wall surface. Furthermore, the present invention enables discharging of the chips to be smoothed, thus allowing the thinned wall portion at the leading end of the drill body to be restrained from being broken.

BRIEF DESCRIPTION OF THE DRAWINGS

Further features of the present invention will become apparent from the following description of exemplary embodiments (with reference to the attached drawings).

DETAILED DESCRIPTION

An embodiment of an indexable drill and a drill body according to the present invention will be described with reference to FIG. 1 to FIG. 6.

An indexable drill shown in FIG. 1 to FIG. 6 includes a drill body 1 and two cutting inserts 7A and 7B for installation in the drill body 1.

The drill body 1 is a substantially cylindrical member of the indexable drill which has an axis of rotation O. The drill body 1 includes a shank portion 3, a flange portion 4, a first chip discharging groove 5A and a second chip discharging groove 5B, and a central edge insert attachment seat 6A and an outer peripheral edge insert attachment seat 6B.

Figure 6:
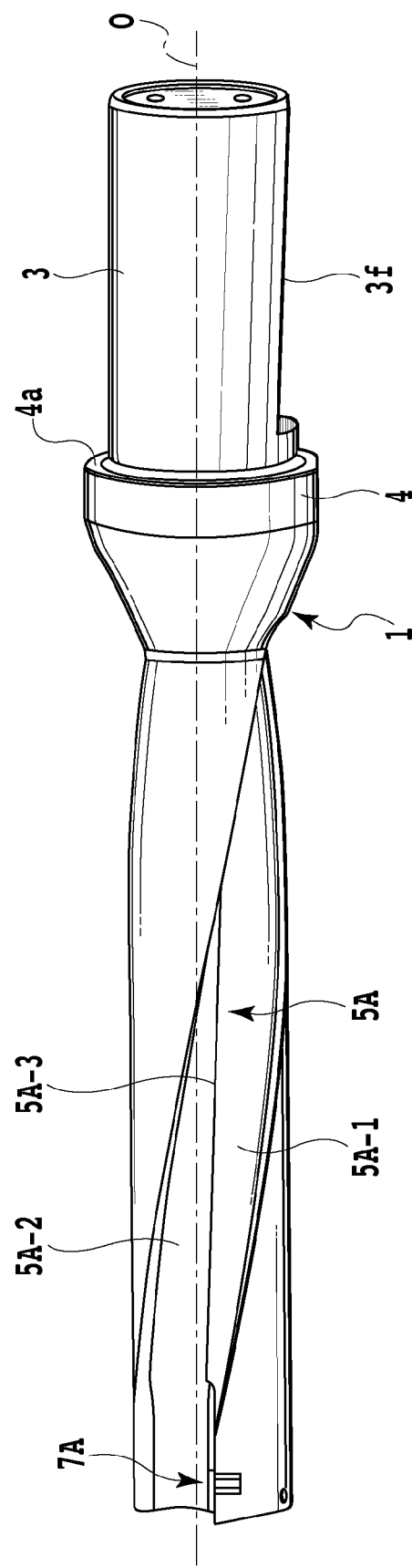
FIG. 6 is another perspective view of the indexable drill in FIG. 1.

The shank portion 3 is formed on a trailing end side of the axis of rotation O of the drill body 1 (on the right side of FIG. 1) so as to allow the drill body 1 to be removably installed in a machine tool such as a machining center. As shown in FIG. 6, the shank portion 3 includes a surface 3f formed thereon parallel to the axis of rotation O. The flange portion 4 includes an end surface 4a provided adjacent to the shank 3 and which, when installed in a machine tool, comes into abutting contact with a spindle of the machine tool or an end surface of a holder.

The first chip discharging groove 5A and the second chip discharging groove 5B are spirally formed so as to extend from a leading end surface 1f toward the trailing end side of the drill body 1 and to the middle of the flange portion 4. The first chip discharging groove 5A and the second chip discharging groove 5B are configured to discharge chips generated by cutting inserts 7A and 7B from the leading end surface 1f toward trailing end side of the drill body 1. The first chip discharging groove 5A and the second chip discharging groove 5B are rotationally symmetric with respect to the axis of rotation O of the drill body 1. In the present embodiment, the first chip discharging groove 5A and the second chip discharging groove 5B are defined by first wall surfaces 5A-1 and 5B-1 facing in a drill rotating direction R shown in FIG. 3 and second wall surfaces 5A-2 and 5B-2 crossing the first wall surfaces 5A-1 and 5B-1 substantially at right angles and facing in a direction opposite to the tool rotating direction R, respectively.

The central edge attachment seat 6A is recessed in a leading end portion of the first wall surface 5A-1 of the first chip discharging groove 5A so that the cutting insert 7A can be attached to the central edge attachment seat 6A. The outer peripheral edge attachment seat 6B is recessed in a leading end portion of the first wall surface 5B-1 of the second chip discharging groove 5B so that the cutting insert 7B can be attached to the outer peripheral edge attachment seat 6B. The central edge attachment seat 6A allows the cutting insert 7A to be located close to the central axis O. The outer peripheral edge attachment seat 6B allows the cutting insert 7B to be located away from the central axis O.

Figure 3:
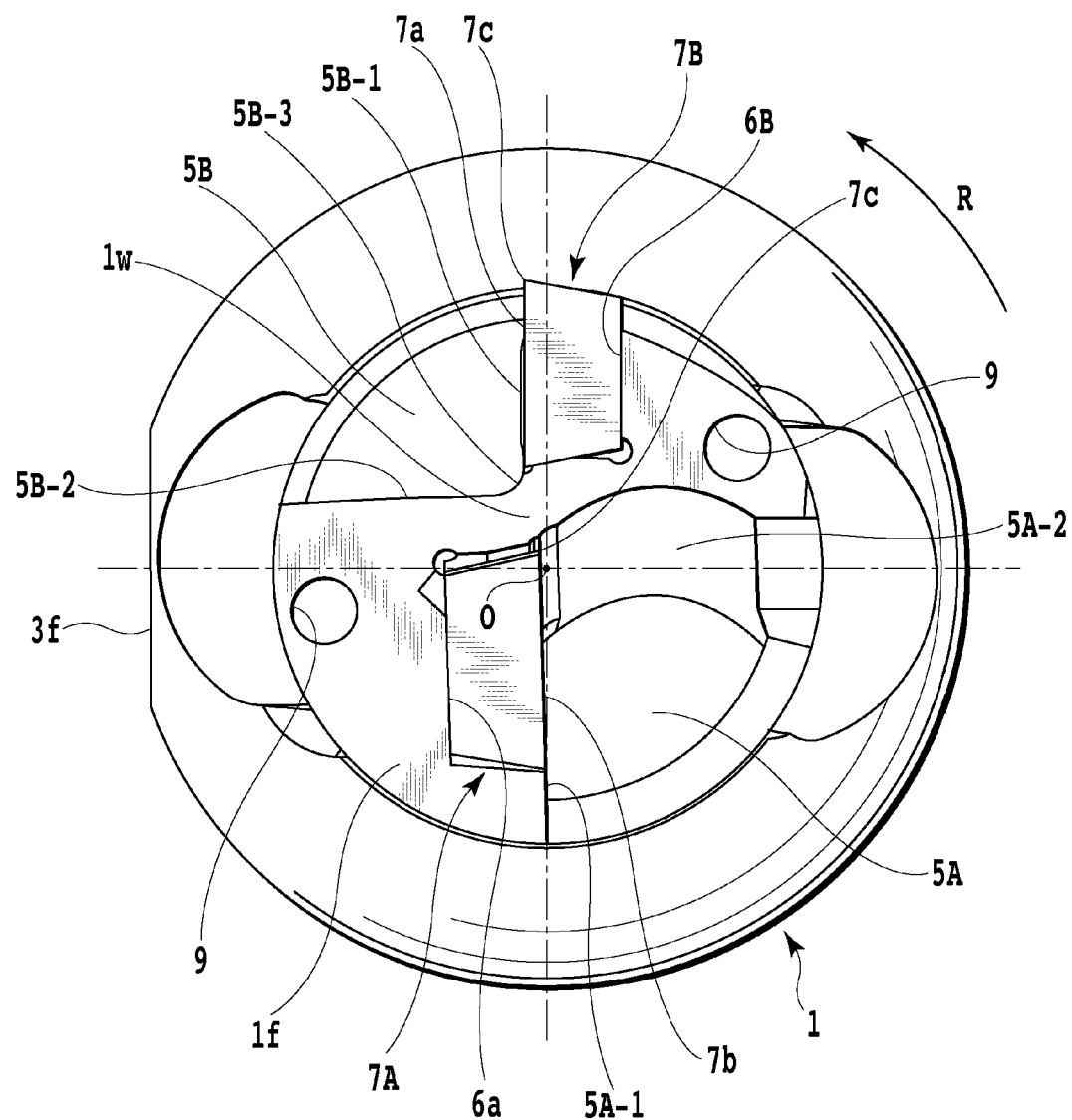
FIG. 3 is a front view of the leading end portion of the indexable drill in FIG. 1 as seen from the direction of an axis of rotation.
Figure 4:
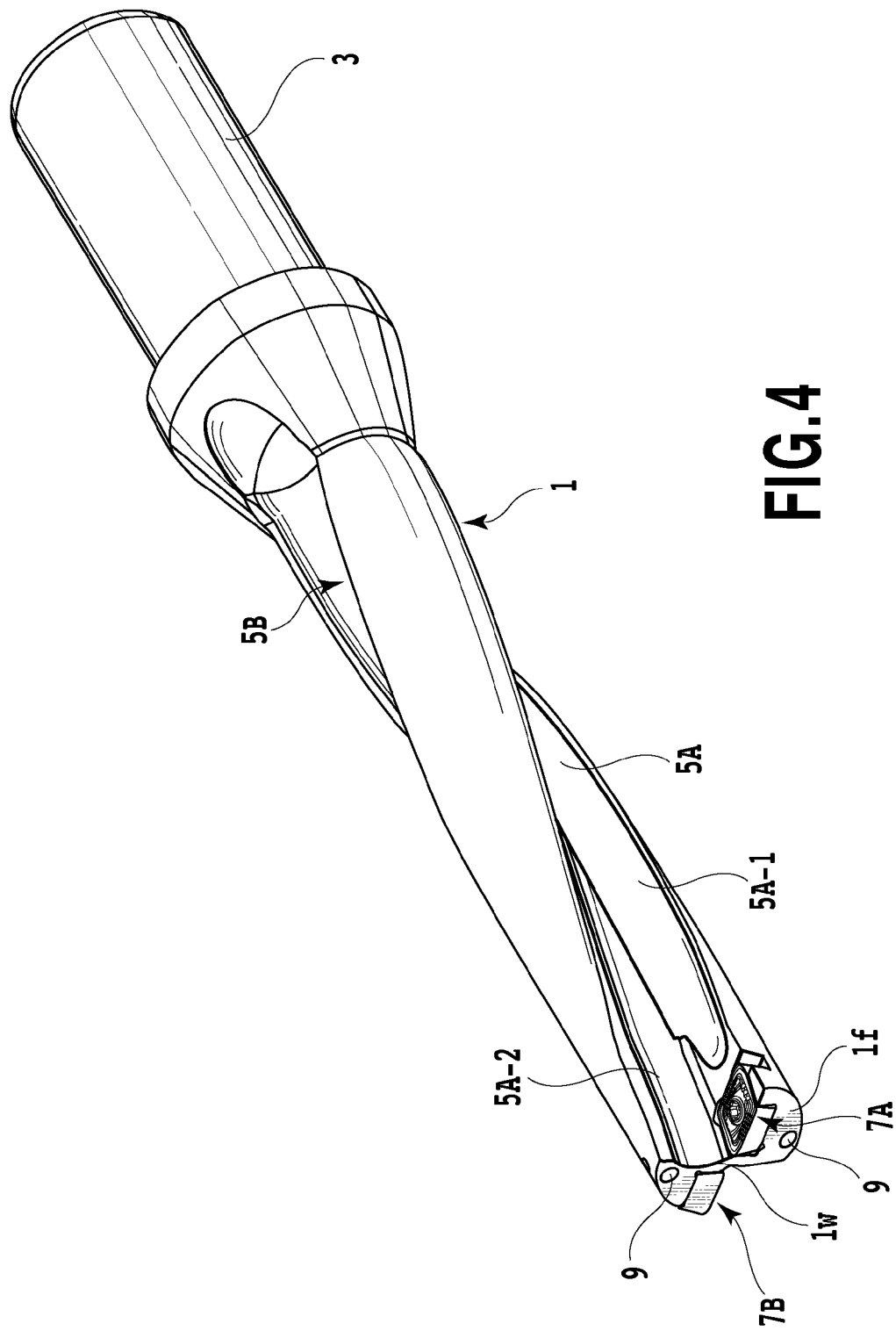
FIG. 4 is a perspective view of the indexable drill in FIG. 1.
Figure 5:
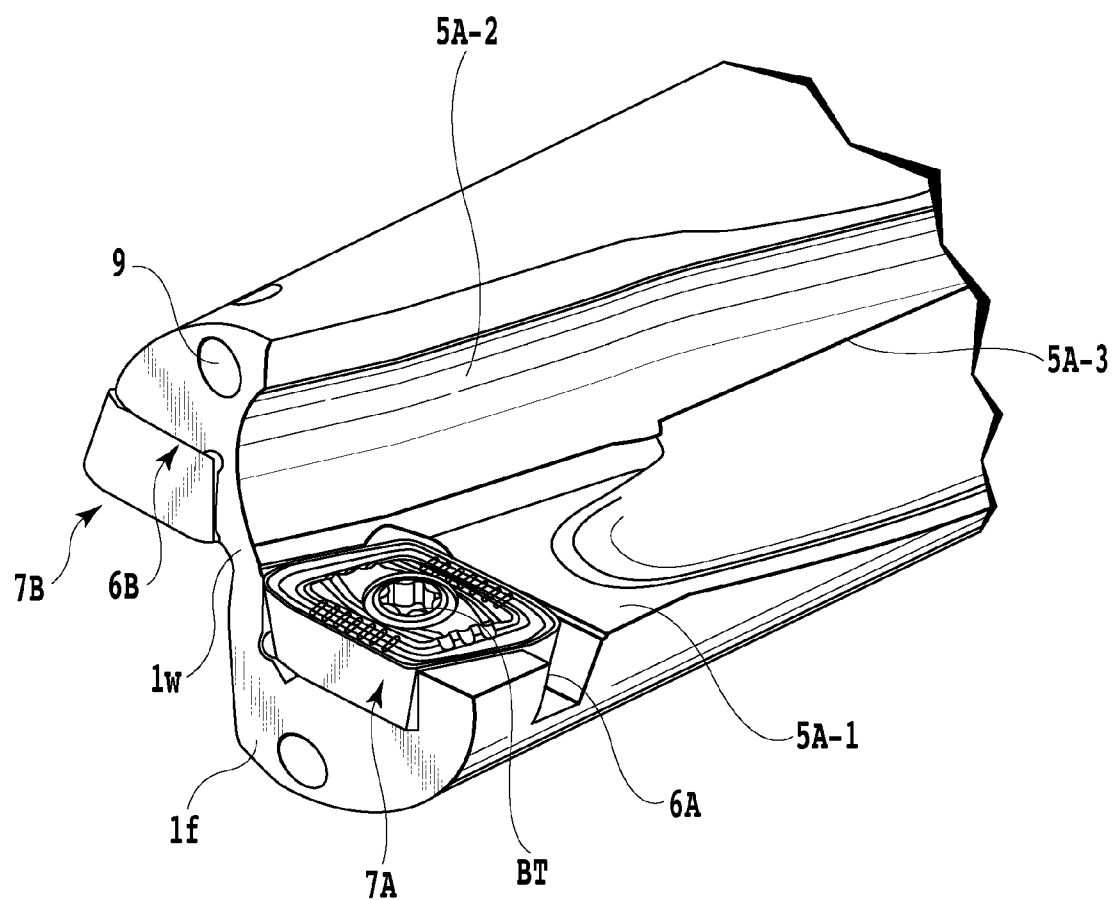
FIG. 5 is an enlarged view of the leading end portion of the indexable drill shown in FIG. 1.

Since the central edge attachment seat 6A and the outer peripheral edge attachment seat 6B are formed at the leading end portion of the drill body 1, a thinned wall portion 1w that is thinner than a rotational-outward-direction-side wall portion of the drill body is present between the central edge attachment seat 6A and the second wall surface 5B-2 and between the outer peripheral edge attachment seat 6B and the second wall surface 5A-2, as shown in FIG. 3 and other figures.

Two oil holes 9 are formed inside the drill body 1 so that one end of each of the oil holes 9 is open in the leading end surface 1f, while the other end is open in a trailing end surface of the shank 3. The oil holes 9 are provided to allow coolant to be injected from the leading end surface 1f toward an end cutting edge of the cutting edge.

Figure 1:
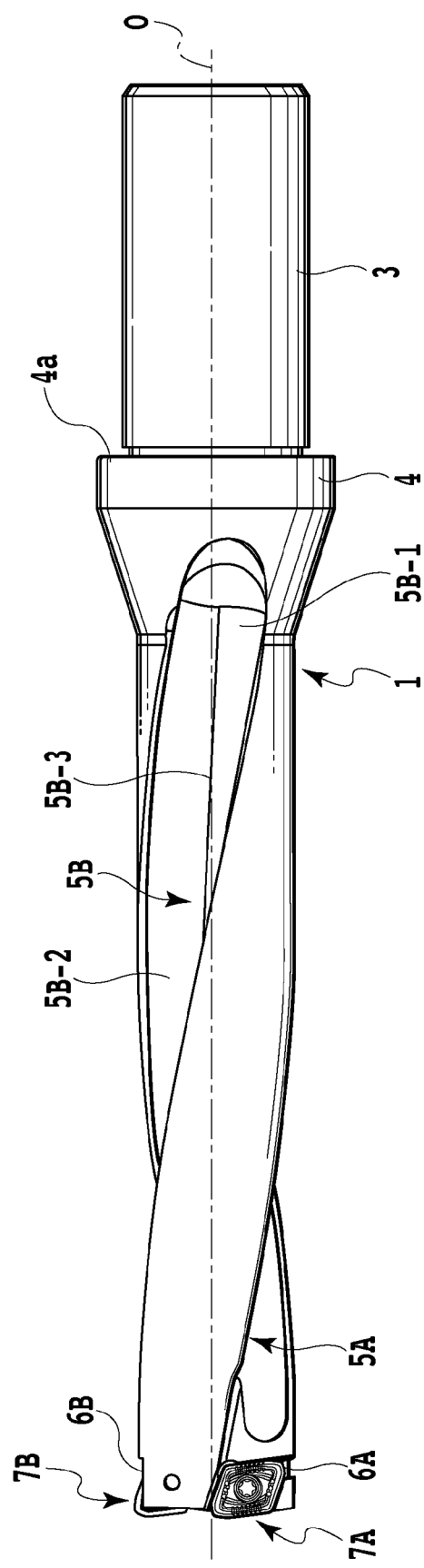
FIG. 1 is a side view of an indexable drill according to an embodiment of the present invention.
Figure 2:
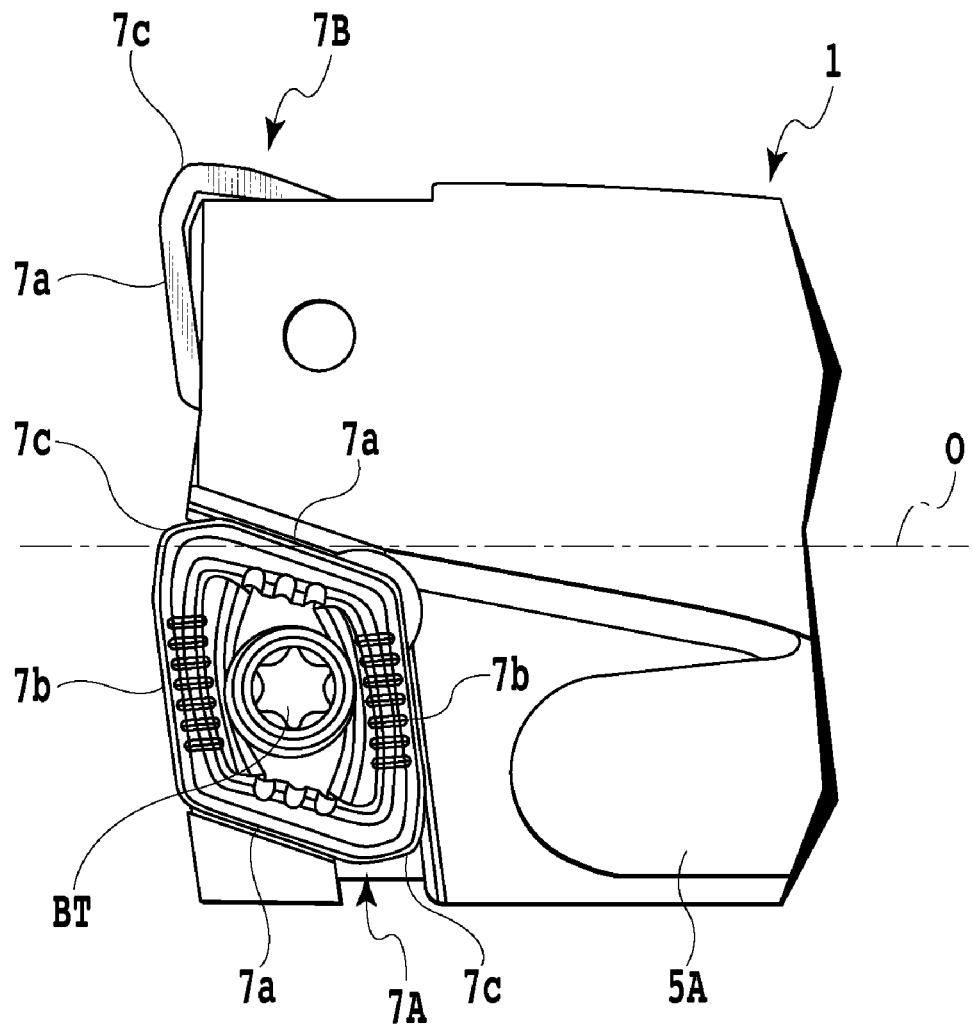
FIG. 2 is an enlarged view of a leading end portion of the indexable drill in FIG. 1.

As shown in FIG. 2 and other figures, the cutting inserts 7A and 7B are attached to central edge attachment seat 6A and the outer peripheral edge attachment seat 6B, respectively, using clamp bolts BT. The cutting inserts 7A and 7B have the same structure and, in the present embodiment, are formed of a hard material selected from cemented carbide, cermet, ceramic, or the like. The cutting inserts 7A and 7B are of a positive type and are each formed like a flat plate with a parallelogrammic external shape. When the cutting inserts 7A and 7B are attached to the central edge attachment seat 6A and the outer peripheral edge attachment seat 6B, an upper surface of each cutting insert located opposite a seating surface forms a rake face, and a side surface thereof forms a flank face. The flank face is provided with a flank angle of 11° according to the present embodiment. A chip breaker is formed on the rake face so as to rise from the rake face. Each of the cutting inserts 7A and 7B includes an attachment hole formed in a central portion thereof and penetrating the cutting insert from the rake face toward the seating surface.

The cutting inserts 7A and 7B are further configured as follows. As shown in FIG. 2, in the crossing portion between the rake face and the flank face, each short side portion of the substantial parallelogram forms a cutting edge 7a. Each long side portion of the substantial parallelogram forms a cutting edge 7b. Each corner portion of the substantial parallelogram which forms an acute angle forms a cutting edge 7c. If the cutting inserts 7A and 7B as shown in FIG. 2 are used for boring or the like, then in the cutting insert 7A (hereinafter also referred to as the central edge insert 7A), the cutting edges 7b and 7c contribute to cutting. In the cutting insert 7B (hereinafter also referred to as the outer peripheral edge insert 7B), the cutting edges 7a and 7b contribute to cutting. Furthermore, the outer peripheral edge insert 7B has a shorter cutting width than the central edge insert 7A.

The drill body 1 is preferably formed of a material such as carbon steel, alloy steel, tool steel, or the like. The present embodiment adopts SKD11 (JIS·G4404-2006), a type of alloy tool steel included in tool steel. After the shank portion 3 and the flange portion 4 are formed, the drill body 1 as a whole is subjected to heat treating such as quenching and tempering so as to have a hardness of 40 to 60 HRC in terms of Rockwell hardness. Before the drill body 1 is quenched, the first chip discharging groove 5A and the second chip discharging groove 5B have not been formed or have been roughly processed. After the drill body 1 is quenched and tempered so as to have the above-described hardness, the first chip discharging groove 5A and the second chip discharging groove 5B are cut with a cutting tool such as an endmill. When roughly processed, the first chip discharging groove 5A and the second chip discharging groove 5B can each be finished to a desired shape by using a grinding agent to grind the wall surface thereof. The drill body 1 is desirably excellent in corrosion resistance and strength (high-temperature strength). In this regard, stainless steel and heat-resistant steel are suitable as a material for forming the drill body 1.

When the first chip discharging groove 5A and the second chip discharging groove 5B are formed in the drill body 1 using a cutting tool such as an endmill, the rotating endmill may be arranged so that the axis of rotation of the endmill is substantially orthogonal to the axis of rotation O of the drill body 1. The outer peripheral cutting edge of the endmill preferably maintains its posture so as to lie along the first wall surface 5A-1 of the first chip discharging groove 5A and the first wall surface 5B-1 of the second chip discharging groove 5B. In this condition, the endmill is fed from the leading end side toward trailing end side of the drill body 1 to allow the first wall surfaces 5A-1 and 5B-1 to be cut. To allow the second wall surfaces 5A-2 and 5B-2 of the chip discharging grooves 5A and 5B to be cut, the endmill is fed from the leading end portion to the trailing end portion of the drill body 1 with the outer peripheral cutting edge of the endmill maintaining its posture so as to lie along the second wall surfaces 5A-2 and 5B-2. Here, the endmill is a radius endmill or a ball endmill. As a result of cutting with the endmill, a first crossing portion 5A-3 between the first wall surface 5A-1 and the second wall surface 5A-2 and a second crossing portion 5B-3 between the first wall surface 5B-1 and the second wall surface 5B-2 form curved surfaces rounded so as to have a radius of curvature almost equal to the corner radius or ball radius of the endmill.

If the first chip discharging groove 5A and the second chip discharging groove 5B are roughly processed before the drill body 1 is heat-treated, no operation but finish cutting with the endmill is required as described above. On the other hand, if no processing is carried out on the first chip discharging groove 5A and the second chip discharging groove 5B before the drill body 1 is thermally treated, cutting all the grooves at once with the endmill places an excessively heavy load on the endmill and the drill body 1. Thus, desirably, at least one rough cutting operation is performed before the final finish cutting is carried out. The wall surface of each groove having undergone the finish cutting may be subjected to cutting (what is called zero cut) using the same tool path as that in the finish cutting. This enables a further reduction in the surface roughness of the wall surface of each of the first chip discharging groove 5A and the second chip discharging groove 5B.

As described above, the central edge attachment seat 6A and the outer peripheral edge attachment seat 6B are formed at the leading end portion of the first wall surface 5A-1 of the first chip discharging groove 5A and at the leading end portion of the first wall surface 5B-1 of the second chip discharging groove 5B. Furthermore, the outer peripheral surface of the drill body 1 is turned so as to have a desired outer diameter dimension. The turning may leave burrs on the first and second wall surfaces of the first chip discharging groove 5A and the second chip discharging groove 5B. However, the burrs and can be removed by cutting the wall surfaces using a cutting tool such as an endmill.

As described above, the drill body 1 includes the thinned wall portion 1w at the leading end portion 1w. However, the toughness of the drill body 1 can be restrained from being degraded, by adjusting the hardness of the thinned wall portion 1w to 40 to 60 HRC in Rockwell hardness. Thus, the thinned wall portion 1w can be restrained from being broken. This enables the life of the drill body 1 to be extended.

In the present embodiment, to allow chips to be smoothly discharged, the first and second wall surfaces of the first chip discharging groove 5A and the second chip discharging groove 5B are smoothed so as to have a surface roughness of at most 0.5 μm (JIS•B0601:2001) in terms of arithmetic average roughness Ra. The present embodiment adopts SKD11 as a material for the drill body 11 and adjusts the hardness of SKD11 from 40 to 60 HRC. Thus, when the endmill is used to cut the first wall surface 5A-1 of the first chip discharging groove 5A, the second wall surface 5A-2 of the first chip discharging groove 5A, the crossing portion 5A-3 between the first wall surface 5A-1 and the second wall surface 5A-2, the first wall surface 5B-1 of the second chip discharging groove 5B, the second wall surface 5B-2 of the second chip discharging groove 5B, the crossing portion 5B-3 between the first wall surface 5B-1 and the second wall surface 5B-2, chips are restrained from adhering to the cutting edges and wall surfaces of the endmill. This enables formation of protrusions on the wall surfaces to be prevented. The wall surfaces thus have a surface roughness of at most 0.5 μm in terms of arithmetic average roughness Ra. When the wall surfaces of the first chip discharging groove 5A and the second chip discharging groove 5B partly or entirely have a surface roughness of at most 0.5 μm in terms of Ra, the wall surfaces can be made smooth enough to reduce friction caused by the contact of the wall surfaces with chips. This allows chips to be smoothly discharged. In terms of the efficiency with which the first chip discharging groove 5A and the second chip discharging groove 5B are processed, Ra is desirably greater than 0.1 μm.

On the other hand, if a grinding tool is used to grind the first wall surface 5A-1 and second wall surface 5A-2 of the first chip discharging groove 5A and the first wall surface 5B-1 and second wall surface 5B-2 of the second chip discharging groove 5B, the wall surfaces are ground only by a small amount in the depth direction. Thus, the first wall surfaces 5A-1 and 5B-1 and the second wall surfaces 5A-2 and 5B-2 are desirably shaped using a cutting tool such as above-described endmill so as to leave a slight removal stock to be removed by grinding.

The adopted grinding with the grinding tool may be known grinding such as grinding with a brush mixed with a grinding agent, polishing, barrel grinding, buffing, or lapping. The grinding agent adopted may be a known grinding agent, for example, chromium oxide, iron oxide, diamond, silicon carbide, aluminum oxide, or cubic boron nitride. Alternatively, shot blasting may be used in which a shot blast material is allowed to collide against at least the wall surfaces of the first chip discharging groove 5A and the second chip discharging groove 5B. In this case, when the shot blast material is particles of diameter at most about 100 μm, the shot blasting is effective for improving the surface roughness of the wall surfaces. The shot blasting increases the hardness of the wall surfaces and also improves wear resistance.

When the grinding agent is used to grind the first and second wall surfaces of the first chip discharging groove 5A and the second chip discharging groove 5B and the crossing portions between these wall surfaces, protruding portions of the first and second wall surfaces are preferentially ground as well. This allows the first and second surfaces of the first chip discharging groove 5A and the second chip discharging groove 5B to be smoothed so as to have a surface roughness Ra of at most 0.5 μm.

In the indexable drill according to the present embodiment, during boring, cutting oil is continuously supplied to a cutting site through the oil holes 9. The cutting oil flows together with chips from the leading end toward trailing end of the drill through the first chip discharging groove 5A and the second chip discharging groove 5B. Thus, the chips are forcibly swept way toward the trailing end of the drill body 1. At this time, chips generated by the central edge insert 7A come into contact with the first wall surface 5A-1 or second wall surface 5A-2 of the first chip discharging groove 5A. Chips generated by the outer peripheral edge insert 7B come into contact with the first wall surface 5B-1 or second wall surface 5B-2 of the second chip discharging groove 5B. In the indexable drill according to the present embodiment, since the first wall surface 5A-1 and second wall surface 5A-2 of the first chip discharging groove 5A and the first wall surface 5B-1 and second wall surface 5B-2 of the second chip discharging groove 5B are smoothed, the flow of the chips is prevented from being hampered, allowing the chips to be smoothly discharged toward the trailing end. At this time, since the first chip discharging groove 5A and the second chip discharging groove 5B are spirally formed, what is called pumping action urges the chips to be discharged.

In the present embodiment, on the smoothed wall surfaces of the first chip discharging groove 5A and the second chip discharging groove 5B, a coat with a higher hardness than the wall surfaces can be formed. This improves the wear resistance of the first chip discharging groove 5A and the second chip discharging groove 5B. Thus, wear caused by the contact of the grooves 5A and 5B with chips is suppressed. The coat may be electroless nickel plating, hard chromium plating, or the like. The hard chromium plating provides a hard coat and thus high wear resistance. In these types of plating, the surface roughness of the coat surface is almost equivalent to that of the wall surface of the groove. Thus, the coat is prevented from hampering the flow of the chips, allowing maintenance of the effect of urging the flow of the chips through the grooves.

The present invention is not limited to the above-described embodiments. Of course, changes, additions, deletions, and the like may be appropriately made to the embodiments without departing from the spirit of the present invention.

For example, in the above-described embodiments, the wall surfaces defining the first chip discharging groove 5A and the second chip discharging groove 5B are entirely smoothed. However, parts of the wall surfaces which are likely to be worn may be exclusively smoothed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A drill body of an indexable drill comprising:
an insert attachment seat on which a cutting insert formed on a leading end side of the drill body in a direction of an axis of rotation is removably installed; and
a chip discharging groove formed so as to extend from a leading end surface to a trailing end side of the drill body in the direction of the axis of rotation and through which chips generated by the cutting insert are discharged, wherein
a wall surface defining the chip discharging groove is defined by a first wall surface facing in a drill rotating direction and a second wall surface crossing the first wall surface,
the insert attachment seat comprises a central edge attachment seat on which the cutting insert is installed close to an axis of rotation and an outer peripheral edge attachment seat on which the cutting insert is installed away from the axis of rotation,
the wall surface of the chip discharging groove is partly formed on a thinned wall portion thinned by the central edge attachment seat and the outer peripheral edge attachment seat,
a crossing portion between the first wall surface and the second wall surface in the thinned wall portion is rounded,
the drill body is formed of one of materials including carbon steel, alloy steel, and tool steel, and having a hardness of at least 40 HRC and at most 60 HRC in terms of Rockwell hardness, per JIS Z 2245:2005, and
at least a portion of the wall surface of the chip discharging groove comprises a milled surface having a surface roughness of greater than 0.1 μm and at most 0.5 μm in terms of arithmetic average roughness Ra, per JIS B 0601:2001.

2. The drill body according to claim 1, further comprising, a coat with a higher hardness than the wall surface is formed at least on the smoothed surface of the wall surface of the chip discharging groove.

3. The drill body according to claim 2, wherein the coat includes hard chrome plating.

4. An indexable drill comprising:
a drill body comprising an insert attachment seat formed on a leading end side of the drill body in a direction of an axis of rotation and a chip discharging groove formed so as to extend from a leading end surface to a trailing end side of the drill body in the direction of the axis of rotation; and
a cutting insert attached to the insert attachment seat and comprising a cutting edge projecting from the leading end surface of the drill body in the direction of the axis of rotation; wherein:
a wall surface of the chip discharging groove is defined by a first wall surface facing in a drill rotating direction and a second wall surface crossing the first wall surface,
the insert attachment seat comprises a central edge attachment seat on which the cutting insert is installed close to an axis of rotation and an outer peripheral edge attachment seat on which the cutting insert is installed away from the axis of rotation,
the wall surface of the chip discharging groove is partly formed on a thinned wall portion thinned by the central edge attachment seat and the outer peripheral edge attachment seat,
a crossing portion between the first wall surface and the second wall surface in the thinned wall portion thinned is rounded,
the drill body is formed of one of materials including carbon steel, alloy steel, and tool steel, and having a hardness of at least 40 HRC and at most 60 HRC in terms of Rockwell hardness, per JIS Z 2245:2005, and
at least a portion of the wall surface of the chip discharging groove comprises a shot blasted surface having a surface roughness of greater than 0.1 μm and at most 0.5 μm in terms of arithmetic average roughness Ra, per JIS B0601:2001.

5. A drill body having a rotational axis (O) and a drill rotation direction (R), the drill body comprising:
a front end surface, a trailing end side and first and second milled chip discharging grooves which extend from the front end surface towards the trailing end side along the rotational axis (O), each chip discharging groove having a first wall surface that faces the drill rotation direction (R) and a second wall surface that faces a direction opposite the drill rotation direction (R);
a central edge attachment seat recessed into the first wall surface of the first chip discharging groove, proximate the front end surface, the central edge attachment seat configured to accommodate a cutting insert close to the rotational axis;
an outer peripheral edge attachment recessed into the first wall surface of the second chip discharging groove, proximate the front end surface, the outer peripheral edge attachment configured to accommodate a cutting insert away from the rotational axis; and
a thinned wall portion formed between the central edge attachment seat and the outer peripheral edge attachment seat; wherein:
the first and second wall surfaces of each chip discharging groove merge at a rounded crossing portion;
each of the second wall surfaces of the first and second chip discharging grooves is at least partly formed on the thinned walled portion; and
the second wall surface of the first chip discharging groove at least partly comprises a first milled surface with a surface roughness of between 0.1 μm and at most 0.5 μm in terms of arithmetic average roughness Ra, per JIS B 0601:2001, wherein the drill body is formed from one of the group of materials consisting of carbon steel, alloy steel, and tool steel, and having a hardness of at least 40 HRC and at most 60 HRC in terms of Rockwell hardness, per JIS Z 2245:2005.

6. The drill body according to claim 5, wherein said first smoothed surface has a first coat with a hardness that is higher than a hardness of remaining wall surfaces of the first chip discharging groove.

7. The drill body according to claim 6, wherein the first coat includes hard chrome plating.

8. The drill body according to claim 5, wherein:
the second wall surface of the second chip discharging groove at least partly comprises a second milled surface with a surface roughness of greater than 0.1 μm and at most 0.5 μm in terms of arithmetic average roughness Ra, per JIS B 0601:2001.

9. The drill body according to claim 8, wherein said second smoothed surface has a second coat with a hardness that is higher than a hardness of remaining wall surfaces of the second chip discharging groove.

10. The drill body according to claim 9, wherein the second coat includes hard chrome plating.

11. The drill body according to claim 2, wherein a surface roughness of the coat is approximately equal to a surface roughness of the chip discharging groove.

12. The indexable drill according to claim 4, further comprising:
a coat on the chip discharging groove, the coat having a higher hardness than the wall surface of the chip discharging groove.

13. The drill body according to claim 12, wherein a surface roughness of the coat is approximately equal to the surface roughness of the chip discharging groove.

14. The drill body according to claim 6, wherein a surface roughness of the first coat is approximately equal to the surface roughness of the first chip discharging groove.

15. The drill body according to claim 1, wherein the milled surface is not subject to additional processing to realize its surface roughness.

16. The drill body according to claim 4, wherein the shot blasted surface is not subject to additional processing to realize its surface roughness.

17. The drill body according to claim 5, wherein the first milled surface is not subject to additional processing to realize its surface roughness.

18. A method making the drill body according to claim 5, comprising:
providing a drill body comprised of one of carbon steel, alloy steel, or tool steel, and having a hardness of at least 40 HRC and at most 60 HRC in terms of Rockwell hardness, per JIS Z 2245:2005;
milling a chip discharging groove in the drill body such that at least a portion of a wall surface of the chip discharging groove comprises a milled surface with a surface roughness between 0.1 μm and 0.5 μm in terms of arithmetic average roughness Ra, per JIS B 0601:2001; and
applying a coat with a higher hardness than the wall surface to the wall surface of the chip discharging groove.

* * * * *